United States Patent [19]
Frederick

[11] 3,958,412
[45] May 25, 1976

[54] FLUIDIC GAS TURBINE FUEL CONTROL

[75] Inventor: Gary L. Frederick, Tempe, Ariz.

[73] Assignee: The Garrett Corporation, Los Angeles, Calif.

[22] Filed: Feb. 25, 1974

[21] Appl. No.: 445,763

[52] U.S. Cl. .......................... 60/39.03; 60/39.28 R; 137/805; 137/818
[51] Int. Cl.² ............................................... F02C 9/10
[58] Field of Search ............... 60/39.28 R, 39.28 T, 60/39.03; 137/805, 804, 818; 415/10, 17, 15

[56] References Cited
UNITED STATES PATENTS

| | | | |
|---|---|---|---|
| 3,302,398 | 2/1967 | Taplin | 60/39.28 R |
| 3,469,395 | 9/1969 | Spitsbergen | 60/39.28 R |
| 3,482,396 | 12/1969 | Nelson | 60/39.28 R |
| 3,488,948 | 1/1970 | Cornett | 60/39.28 R |
| 3,587,230 | 6/1971 | Schmidt | 60/39.28 R |
| 3,616,647 | 11/1971 | Johnson | 60/39.28 R |
| 3,630,023 | 12/1971 | Lazar | 60/39.28 T |
| 3,759,296 | 9/1973 | O'Connor | 60/39.28 R |

*Primary Examiner*—Clarence R. Gordon
*Attorney, Agent, or Firm*—Herschel C. Omohundro; Jack D. Puffer; Albert J. Miller

[57] ABSTRACT

A pure fluidic fuel control system for a gas turbine engine in which engine speed and compressor discharge pressure are sensed and utilized to control the flow of fuel to the engine. In the system an analog fluid signal proportional to engine speed is applied to two separate fluidic circuits, one circuit to generate a signal for controlling the engine during acceleration and the other for controlling the engine during steady state operation. The difference between these two signals is multiplied by a signal proportional to the compressor discharge pressure, the product signal being proportional to the necessary fuel flow for any engine condition. The product signal is amplified and applied to a fuel flow valve, the position of which is sensed and fed back to the input of the product signal amplifier for closed loop control.

13 Claims, 10 Drawing Figures

FLUIDIC GAS TURBINE FUEL CONTROL

SUMMARY

This invention relates to control systems for engines and is more particularly directed to a pure fluid system for controlling fuel flow to an engine, the system being substantially completely operated by compressed fluid from the engine in response to engine speed and compressor discharge pressure.

The invention also relates to fuel control systems of the type exemplified by the U.S. Pat. Nos. 3,469,395 to Spitsbergen et al., 3,488,948 to Cornett et al., and 3,616,647 to Johnson.

An object of the invention herein is to provide a fuel control system of a purely fluidic nature which will avoid objections to prior systems in that no mechanical or electrical components are included, thus making the system simpler, more foolproof in operation, adaptable to use under a wide variety of conditions of environment such as excessive heat and cold, and requiring no service whereby it will be suitable for use on an unmanned engine.

An object of the invention also is to provide a fuel control system of the type referred to in the preceding paragraph which will be substantially frictionless, will be relatively insensitive to heat or cold so that it can be located close to or within the engine which it controls, will require no extraneous power source, and will be self-operating, thus eliminating manually induced stall conditions in the engine.

Another object of the invention is to provide a fluidic fuel control system for a gas turbine engine, the system receiving fluid under regulated pressure from the engine and having a component which changes a portion of the fluid pressure into a pulsating signal with a frequency proportional to engine speed, another component converting the pulsating signals to analog signals which are then modified, amplified and otherwise treated in accordance with engine parameters to supply fluid forces employed to actuate a fuel metering valve.

Still another object of the invention is to provide a fluidic fuel control system to which compressed fluid, such as air, is supplied in pulses at a frequency proportional to engine speed, the system having a section which converts the pulse frequency to analog signals, these being employed in generator sections of the system to provide signals for engine acceleration and working phase or steady state governing, the system being further provided with a section for sensing compressor discharge pressure and multiplying the difference between the speed signals, the output of the latter section being amplified and fed to a metering valve to control engine operation; the metering valve position is sensed and a feedback signal is applied to the last amplifying section to modify the output signal thereof.

Other objects and advantages will be apparent from the following description of one fuel control system formed in accordance with the present invention and illustrated in the accompanying drawings.

IN THE DRAWINGS

FIGS. 1 and 1A provide a schematic view of a fuel control system forming the subject matter of the present invention;

DESCRIPTION

Figure 1:
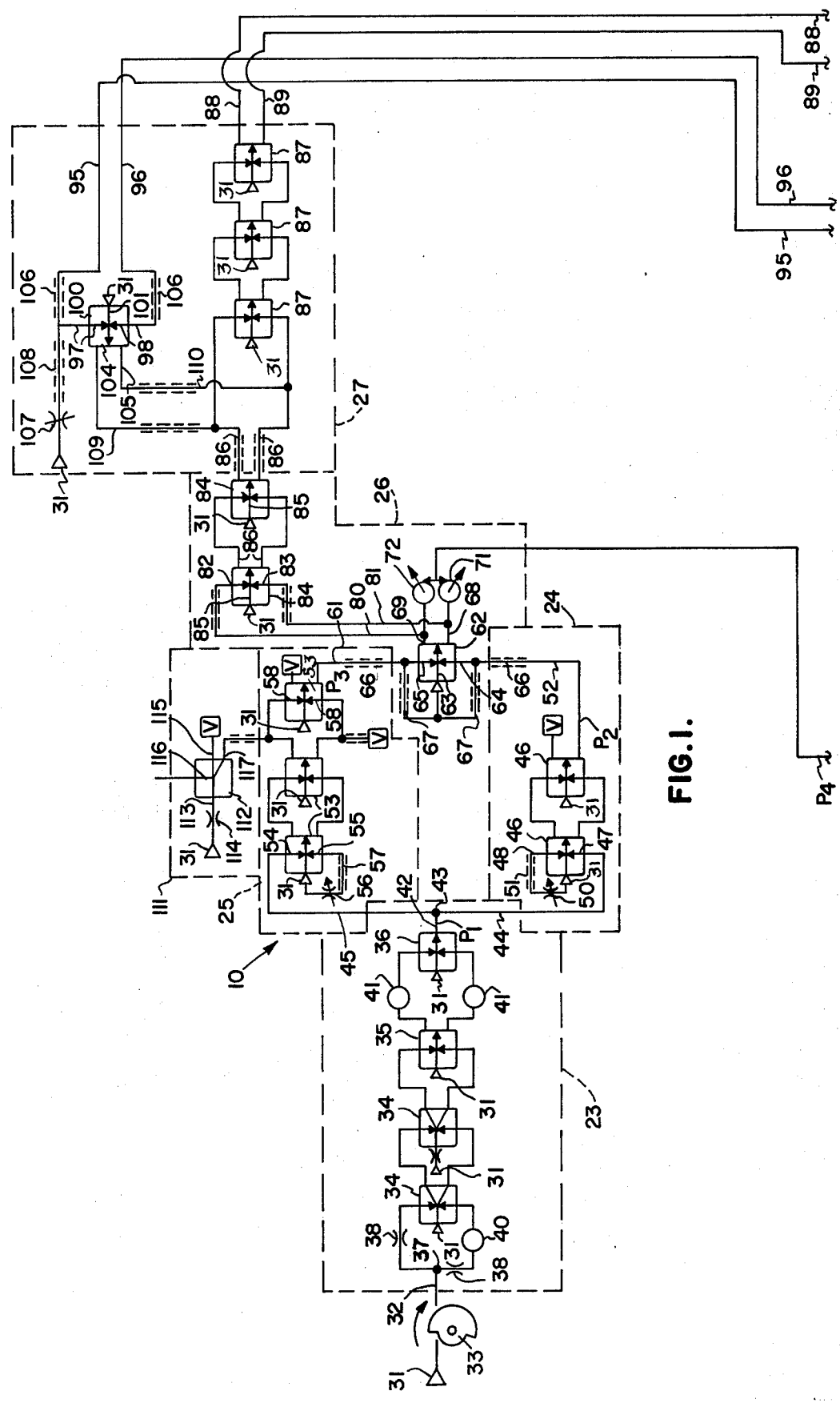
Figure 1A:
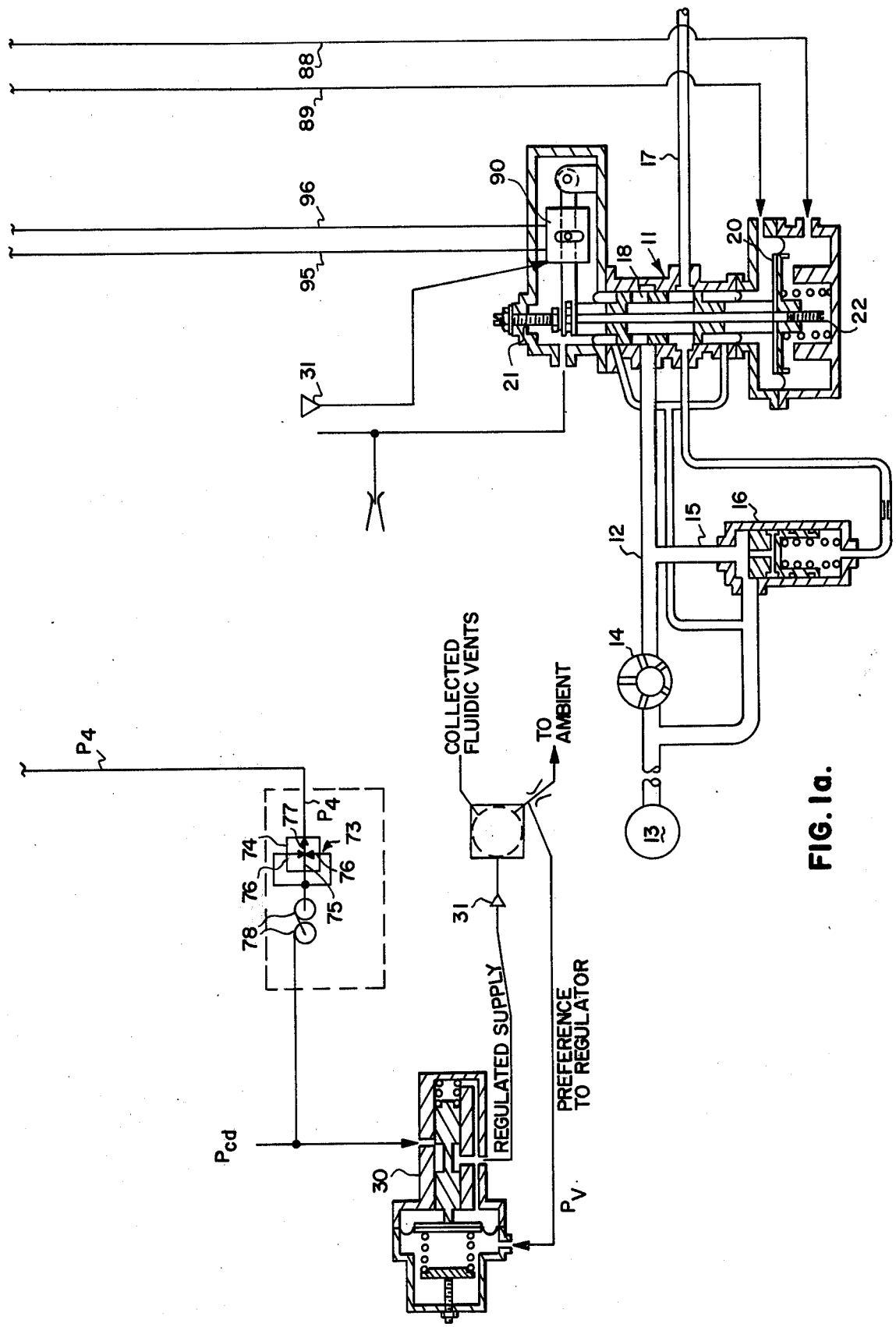

Reference to FIG. 1 of the drawing shows that the fluidic system, designated generally by the numeral 10, is provided to actuate fuel valve 11 by which the operation of a gas turbine engine (not shown) is controlled. Valve 11 communicates via line 12 with a fuel tank 13, and a pump 14 in the line draws fuel from the tank and feeds it under pressure to the valve. A bypass line 15 connects the outlet of the pump with the inlet, line 15 containing a regulator valve 16 by which a suitable pressure drop between the valve inlet and outlet is maintained. A line 17 leads from valve 11 to the engine, and a spool 18 in the valve is movable to control fuel flow from line 12 to line 17, and consequently to the engine. Movement of valve spool 18 is effected by a diaphragm assembly 20 connected to one end thereof. The extent of movement of the spool is limited by adjustable stop screws 21 and 22 located in the valve casing at the ends of the spool. The position of screw 21 determines the minimum fuel flow and the setting of screw 22 determines the maximum fuel admitted to the engine.

To control the operation of the fuel valve 11, the fluidic system 10, constituting the invention, has been provided. FIG. 1 shows that the system 10 includes five major sections designated 23 to 27 inclusive, these sections being enclosed on the drawing by dotted lines for convenience in identification. The system 10 is a purely fluidic one and is powered entirely by fluid under pressure supplied by the compressor of the engine. The compressed fluid is bled from the compressor discharge and is passed through a regulator 30 to provide the system with a compressed fluid supply at a predetermined pressure. The regulated supply is designated by the numeral 31 wherever it appears in the drawing.

Section 23 of the fluidic system has an inlet 32 to which fluid pressure impulses are supplied at a frequency proportional to the speed of the engine. This feature is accomplished by disposing a pulse generator 33 in the line 32. The section 23 is employed to convert the frequency of the pulses to analog signals. Section 23 has one or more digital amplifiers 34 arranged in series and supplying control signals to a proportional amplifier 35. The output signals of the latter provide control signals to a rectifier 36. Each element 34, 35, and 36, receives fluid at regulated pressure from the supply 31. Pulsating signals from the generator 33 are divided, as at 37, and directed through suitable restrictors 38 to opposed control ports in the first of the series of amplifiers 34. One signal after the division is passed through a chamber 40 with a predetermined volume wherein the signal is modified. The output signals from each amplifier are applied to the control ports of the next succeeding amplifier, the output signals flowing to rectifier 36 being modified by passing through volume chambers 41. Rectifier 36 delivers an analog signal $P_1$, bearing a predetermined relation to the speed of the engine, through output line 42.

The analog signal in line 42 is divided, as at 43, into two portions 44 and 45; the former being directed to system section 24 which is provided to generate a speed signal for engine acceleration. System section 24 includes one or more proportional amplifiers 46 arranged in series, each receiving fluid at regulated pressure from source 31. Signal portion 44 is applied to one of the control ports 47 of the first amplifier 46. The other control port 48 thereof receives reference pressure from source 31 through a variable orifice 50 and other suitable restriction 51. One output port of the last amplifier 46 in the series is vented and the fluid signal $P_2$ from the other output port is directed through passage 52 to system section 26.

Portion 45 of the analog signal from section 23 is directed to system section 25 which is also provided to generate a speed signal employed to control engine operation at design speeds or steady state operation. System section 25 also includes a series of proportional amplifiers 53, each receiving fluid at regulated pressure from source 31. Analog signal portion 45 is applied to one of the control ports 54 of the first amplifier 53 of section 25 and the other control port 55 receives reference pressure from source 31 through a variable orifice 56 and a suitable restriction 57. The output signals from the first amplifier 53 are supplied to the control ports of the next succeeding amplifier, and so on. The signal supplied to the control ports 58 of the final amplifier of system section 25 is modified by connecting port 58 to a vent through a predetermined restriction. One output port of the final amplifier 53 is vented. Fluid signal $P_3$ from the other output port is directed through passage 61 to system section 26.

Section 26 constitutes a fluidic signal multiplier of the type shown generally in U.S. Pat. No. 3,537,466 to Chapin, assigned to The Garrett Corporation. This multiplier includes an amplifier 62 having an inlet 63, and opposed control ports 64, 65. Outputs $P_2$ and $P_3$ from the speed signal generators 24 and 25, respectively, are directed through suitable restrictors 66 and 67, then combined and supplied to the amplifier inlet 63. On the downstream side of one restrictor 66, output $P_2$ is supplied to control port 64. Output $P_3$ is supplied to control port 65 after passing through a restrictor 66. Fluid supplied to inlet 63 creates a beam which is impinged and moved between output ports 68 and 69 by fluid supplied to control ports 64 and 65. In this manner the output from ports 68 and 69 reflects the difference between the outputs $P_2$ and $P_3$. Output ports 68 and 69 connect with vortex resistors 71 and 72 which are powered by a fluid signal proportional to the discharge pressure of the engine compressor. The latter signal is obtained through the use of a compressor discharge pressure sensor 73.

Sensor 73 includes a rectifier 74 having an inlet 75, opposed control ports 76 and an output port 77. Fluid at compressor discharge pressure is directed through a series of vortex resistors 78 and supplied to the inlet of the rectifier 74. The output from the resistors 78 is also supplied to the control ports 76 for impingement against a fluid beam generated by the inlet. The output signal $P_4$ from port 77 is proportional to the compressor discharge pressure and is applied to the vortex resistors 71 and 72 to multiply the differential signals issuing from output ports 68 and 69. The resulting multiplied signals are directed through passages 80 and 81 to opposed control ports 82 and 83 of the first of a pair of proportional amplifiers 84. As usual, the inlets 85 of these amplifiers receive regulated pressure from source 31. The output ports 86 of the first amplifier are connected with the control ports of the second amplifier, and the output ports 86 of the latter direct the amplified signals to system section 27. These signals constitute a computed differential pressure signal which is proportional to the fuel flow necessary for all speed and compressor discharge conditions of the engine.

In section 27, the signals are further amplified and modified according to the position of spool 18 of the fuel control valve. System section 27 includes a cascade of proportional amplifiers 87, each of which has its inlet connected to receive regulated pressure from source 31. Each amplifier 87 has opposed control ports and each has spaced output ports. It is obvious that as many amplifiers as may be found necessary or desirable may be employed. The first amplifier 87 in the series in section 27 has its control ports connected with the output ports of the second amplifier 84. Each succeeding amplifier in section 27 is connected in the same way with the preceding amplifier. The output ports of the final amplifier in the series are connected by lines 88, 89 with chambers at opposite sides of the diaphragm assembly 20 of the fuel valve. Lines 88 and 89 apply an amplified differential pressure sufficient to overcome any tendency of the valve spool to stick or otherwise resist movement.

Figure 2:
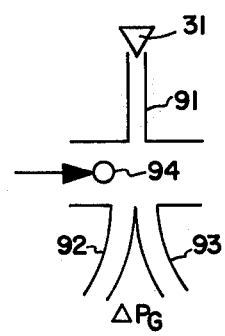
FIG. 2 is a schematic view of a valve spool position sensor and feedback signal generator employed in the system of FIG. 1.

The fuel valve is provided with a fluidic valve position sensor and feedback unit 90 by which the signals are modified, as previously indicated, resulting in a closed loop control. Unit 90 includes a sensor, shown schematically in FIG. 2, which has an inlet 91 supplied with fluid under regulated pressure from source 31. Outlet ports 92, 93 are disposed substantially opposite inlet port 91 to receive a fluid jet therefrom. When the ports 92, 93 receive equal amounts of the jet, the signal pressures therein are equal. A pin 94 is supported for movement between the inlet and outlet ports in response to valve spool movement. The extent of such movement will create a corresponding differential pressure $\Delta P_G$ in ports 92, 93 which is transmitted via lines 95, 96 to section 27 for amplification and application to certain control ports in the cascade of amplifiers 87 to modify the signals generated therein in proportion to the fuel valve spool position. Lines 95, 96 lead to the control ports 97, 98 of a proportional amplifier 100 which, as usual, has an inlet port 101 receiving fluid at regulated pressure from source 31. In addition to the opposed control ports 97, 98, amplifier 100 has output ports 104, 105. Spool position signal from line 95 is applied to control port 97, while the signal from line 96 is applied to control port 98. These signals may be subjected to restriction, as at 106. The signal in line 95 is further modified by applying a reference pressure thereto from the regulator pressure source 31, such pressure being directed through a variable orifice 107 and other restrictor means 108. The resulting signals issuing from output ports 104, 105 are applied through passages 109 and 110 to the output signals from the second amplifier 84 which are directed to the control ports of the first amplifier 87 of the series in section 27. In this manner, a differential signal corresponding to the degree of movement of the valve spool, and consequently the volume of fuel supplied to the engine, will be impressed on the signals used to operate the fuel valve.

If found desirable, one or more extraneously energized signals may be applied to perform certain functions such as resetting one of the engine control signal generating circuits. This feature is exemplified in FIG.

1 by section 111 which has a monostable amplifier 112 with an inlet 113 receiving fluid from regulated pressure source 31. This fluid may pass through a restriction 114 prior to admission to the inlet 113. Normally, fluid admitted to inlet 113 flows directly through amplifier 112 and is vented at 115. When an extraneously generated signal, such as a temperature responsive one, is applied through control port 116, a pressure charge will be directed through output port 117 and impressed on one of the control signals directed to the final amplifier 53 of system section 25.

From the foregoing, it will be apparent that there has been provided a pure fluid control system in which engine speed and compressor discharge pressure are sensed and utilized to control the flow of fuel to the engine. In its more specific aspects, the system provides an analog fluidic signal proportional to engine speed which signal is applied to two separate fluidic circuits, one circuit generating a signal for controlling the engine during acceleration and the other generating a signal for controlling the engine during steady state operation. The difference of these is multiplied by a signal proportional to the compressor discharge pressure; the resulting product signal is proportional to the necessary fuel flow for any engine condition. The product signal is amplified and applied to a fuel flow valve, the position of which is sensed and fed back to the input of the product signal amplifier for closed loop control.

Figure 4A:
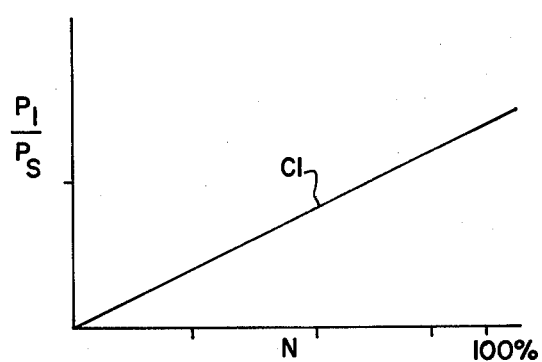
FIG. 4 ($a$, $b$, $c$, $d$, $e$, $f$) includes a group of curves illustrating the output pressures of different portions of the system resulting from various relative input signals.

FIGS. 4a to 4f show output curves of various sections of the fluidic fuel control system. In FIG. 4a, the curve $C_1$ represents the output of the frequency to analog section or circuit. This curve results from plotting the output pressure $P_1$ divided by the regulated supply pressure $P_s$ relative to the percentage of engine design speed N. Curve $C_1$ is a linear curve representing a signal proportional to engine speed.

Figure 4D:
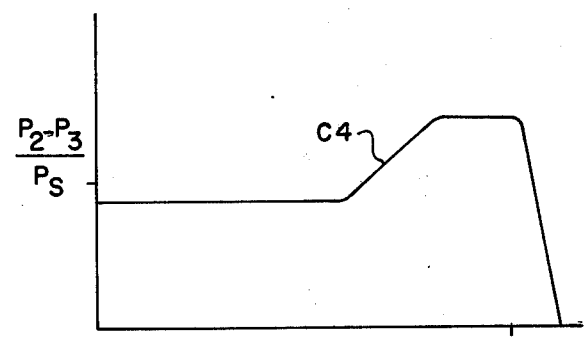
Figure 4B:
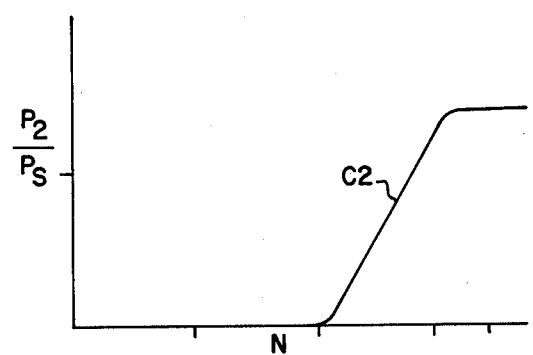

In FIG. 4b, the curve $C_2$ represents the output of the section or circuit which generates the acceleration control signal. This curve results from plotting the output pressure $P_2$ divided by the regulated supply pressure $P_s$ relative to engine speed N.

Figure 4E:
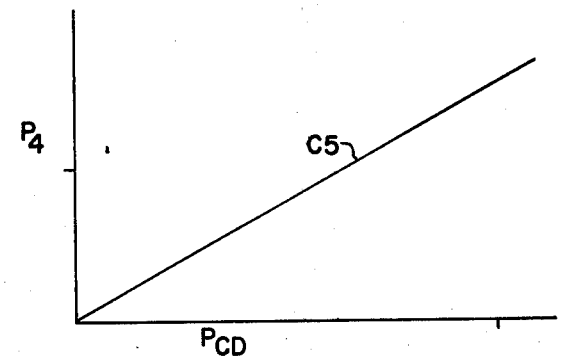
Figure 4C:
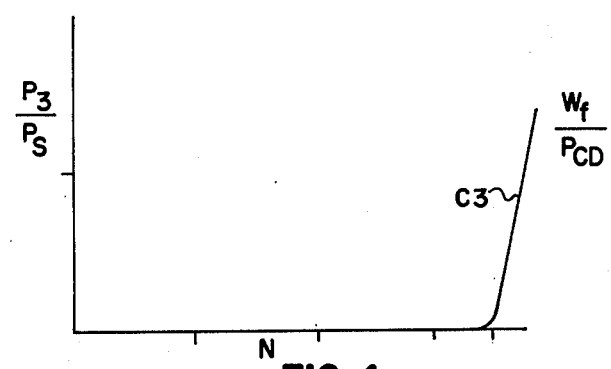

In FIG. 4c, the curve $C_3$ represents the output of the section or circuit which generates the signal used to control the steady state engine operation. This curve results from plotting the output pressure $P_3$ divided by the regulated supply pressure $P_s$ relative to engine speed N.

In FIG. 4d, the curve $C_4$ represents the output of the section or circuit which supplies the speed dependent signal to the multiplier section. This curve results from plotting the quotient of the difference between $P_2$ and $P_3$ divided by the regulated pressure $P_s$ relative to the design speed N.

In FIG. 4e, the curve $C_5$ represents the output of the compressor discharge pressure sensor section. This curve results from plotting the pressure $P_4$ relative to the compressor discharge pressure.

Figure 4F:
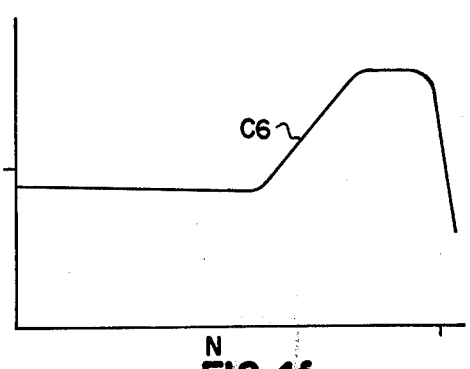

In FIG. 4f, the curve $C_6$ represents the output of the fluidic circuit to the fuel metering valve. Curve $C_6$ results from plotting the quotient of the fuel flow $W_f$ divided by the compressor discharge pressure relative to the engine speed.

Figure 3:
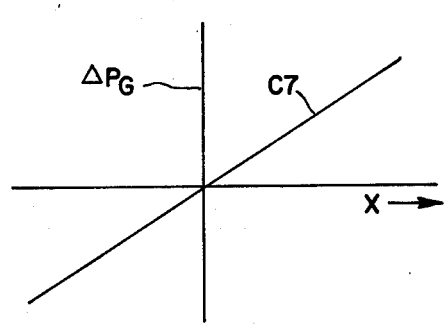
FIG. 3 is a graph showing the relation of the feedback signal pressure relative to the movement of the spool of the fuel scheduling valve during engine operation.

In FIG. 3, the curve $C_7$ results from plotting the feedback sensor pressure relative to the movement of the fuel valve spool.

To adapt the control system to use in widely varying ambient pressures, such as occur at different altitudes, the vents of the various fluidic components are all directed to a common enclosure, such as the inside of the engine, which is in turn vented to ambient atmosphere through a low-pressure ratio sonic orifice. Reference pressure to the regulator is then taken from upstream of the orifice and it will remain substantially uniform regardless of the variation in ambient pressure.

What is claimed is:

1. A fluidic fuel control system for an engine of the type having a rotatable element driving a compressor, comprising:
   a. means receiving compressed fluid from the compressor and providing a regulated fluid pressure source;
   b. means connected for operation by said rotatable element and communicating with said regulated pressure source to generate a pulsing signal with a frequency proportional to the speed of said rotatable element;
   c. a first fluidic means receiving said pulsing signal and converting the same to an analog signal;
   d. a second fluidic means receiving said analog signal and generating a speed signal for governing engine acceleration;
   e. a third fluidic means also receiving said analog signal and generating a speed signal for governing steady state engine operation;
   f. a fourth fluidic means receiving the speed signals from said second and third fluidic means and sensing the compressor output pressure, said fourth fluidic means multiplying the difference between the speed signals with the compressor discharge pressure to create differential signals;
   g. a fifth fluidic means receiving the differential signals from said fourth means and amplifying the same; and
   h. a fuel metering valve communicating with said fifth fluidic means and responding to changes in said amplified differential signal to control fuel flow to said engine.

2. The fluidic fuel control system of claim 1 in which the fifth fluidic means has means for sensing the fuel metering valve position and modifying the valve controlling differential signal accordingly.

3. The fluidic fuel control system of claim 1 in which the fourth fluidic means has an amplifier for receiving signals from the second and third fluidic means and a vortex multiplier responsive to compressor discharge pressure to modify the signals from said second and third fluidic means.

4. The fluidic fuel control system of claim 1 in which the third fluidic means has an amplifier responsive to an externally applied signal to reset the engine speed signal generating means.

5. The fluidic fuel control system of claim 1 in which the first fluidic means has a series of digital amplifiers supplying signals to a proportional amplifier which in turn supplies signals to a fluidic rectifier.

6. The fluidic fuel control system of claim 1 in which the second fluidic means has a plurality of proportional amplifiers arranged in series, one output of the final amplifier in such series being applied as a control signal to said fourth fluidic means.

7. The fluidic fuel control system of claim 1 in which the third fluidic means has a plurality of proportional amplifiers arranged in series, one output of the final amplifier in such series being applied as a control signal to said fourth fluidic means, and means connected in said series between the last and the next preceding amplifier to apply an externally controlled signal to the last amplifier in the series.

8. The fluidic fuel control system of claim 2 in which the means for sensing the fuel metering valve position has an element responsive to valve movement to generate differential signals, and an amplifier responsive to such differential signals to modify the signals applied to said fifth fluidic means.

9. A fluidic fuel control system for a gas turbine engine having a rotating compressor comprising:
   means for sensing the speed of rotation of said engine and generating a fluidic signal representative of said speed;
   first fluidic means receiving said speed signal and generating a fluidic output signal for controlling engine speed under steady state conditions;
   second fluidic means receiving said speed signal and generating a fluidic output signal for changing engine speed according to a predetermined acceleration schedule;
   means for determining the difference in the output signals between said first and second fluidic means;
   third fluidic means for generating an output signal representative of the discharge pressure of the engine compressor;
   fourth fluidic means for receiving the output signal of said third fluidic means and a signal representative of the difference between the output signals of said first and second fluidic means and multiplying the output of said third fluidic means by the difference between the output of said first and second fluidic means and generating an output signal representative of the product thereof; and
   fuel control valves means for receiving the output of said fourth fluidic means for controlling fuel flow to said engine.

10. The fluidic fuel control system according to claim 9 wherein said fourth fluidic means comprises:
    a fluidic amplifier having a power input port and a pair of opposed control input ports and a pair of output ports,
    said power input port being connected to the combined output of said first and second fluidic means and the output of said first fluidic means connected to one of said control input ports and the output of said second means connected to the other of said control input ports;
    a pair of vortex generators powered by the compressor discharge pressure and having the output of each vortex generator connected to one of said output ports of said fluidic amplifier.

11. A fluidic fuel control system according to claim 10 wherein said fuel control valve means includes means for generating a fluidic feedback signal proportional to the condition of said fuel control valve for conditioning the output signal of said fourth fluidic means.

12. A method of controlling the fuel flow to a gas turbine engine having a rotating compressor comprising the steps of:
    measuring the speed of rotation of said engine;
    generating a first fluidic signal for controlling said speed in the steady state operating condition of the engine;
    generating a second fluidic signal for controlling said speed during acceleration of said engine speed;
    generating a third fluidic signal representative of the compressor discharge pressure of said compressor;
    measuring the difference between said first signal and said second signal;
    multiplying the difference between said first and second signals by said third signal to generate a fourth fluidic signal; and
    controlling fuel flow to said engine in accordance with the value of said fourth signal.

13. The method of controlling fuel flow to a gas turbine engine according to claim 12 and further comprising the steps of:
    measuring the effect of said fourth signal on said fuel controlling means;
    generating a feedback signal representative of the condition of said fuel controlling means, and
    connecting said feedback signal to said fourth signal to condition said fourth signal.

* * * * *